(12) United States Patent
Parthasarathy

(10) Patent No.: US 6,226,403 B1
(45) Date of Patent: *May 1, 2001

(54) HANDWRITTEN CHARACTER RECOGNITION USING MULTI-RESOLUTION MODELS

(75) Inventor: Kannan Parthasarathy, Palo Alto, CA (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,838

(22) Filed: Feb. 9, 1998

(51) Int. Cl.[7] .................................................. G06K 9/00

(52) U.S. Cl. ...................... 382/187; 382/159; 382/178; 382/228; 345/171

(58) Field of Search .................................... 382/159, 178, 382/187, 189, 227, 228, 192, 202; 345/171, 173, 179

(56) References Cited

U.S. PATENT DOCUMENTS

| | | | |
|---|---|---|---|
| 4,758,979 | * 7/1988 | Chiao-Yueh | 382/185 |
| 5,544,265 | * 8/1996 | Bozinovic et al. | 382/203 |
| 5,579,408 | * 11/1996 | Sakaguchi et al. | 382/187 |
| 5,583,543 | * 12/1996 | Takashi et al. | 345/173 |
| 5,724,031 | * 3/1998 | Huang | 341/28 |
| 5,818,963 | * 10/1998 | Murdock et al. | 382/187 |

FOREIGN PATENT DOCUMENTS

| | | | |
|---|---|---|---|
| 0538038 | 4/1993 | (EP) | 382/187 |
| 22278678A | 8/1990 | (GB) | 382/187 |

OTHER PUBLICATIONS

Ripley, B.D., "Pattern Recognition and Neural Networks", Cambridge University Press, 1996, pp.311–314.

Duda, Richard O. et al., "Pattern Classification and Scene Analysis", John Wiley & Sons, Inc., 1973, pp. 211–229.

Nakagawa et al., "Robust and Highly Customizable Recognition of On–Line Handwritten Japanese Characters", IEEE Proceedings of ICPR 1996, pp.269–273.

Pyeoung Kee Kim et al., "On–Line Recognition of Run–on Korean Characters", IEEE Proceedings of the Third International Conference on Document Analysis and Recognition, Aug. 14–16, 1995, pp. 54–57.

Tappert, Charles C., et al. "The State of the Art in On–Line Handwriting Recognition", IEEE, 1990.

* cited by examiner

Primary Examiner—Leo Boudreau
Assistant Examiner—Gregory Desire
(74) Attorney, Agent, or Firm—Terri S. Hughes; Romi N. Bose

(57) ABSTRACT

A storage medium (72) having stored thereon a set of instructions, which when loaded into a microprocessor (74), causes the microprocessor (74) to extract strokes from a plurality of characters (76), derive a pre-defined number of stroke models based on the strokes extracted from the plurality of character (78) and represent the plurality of characters as sequences of stroke models (80).

15 Claims, 12 Drawing Sheets

| MODEL | dx | dy | θ1 | θ2 | θ3 | θ4 | θ5 | θ6 | θ7 | θ8 | θ9 | θ10 | θ11 | θ12 |
|---|---|---|---|---|---|---|---|---|---|---|---|---|---|---|
| 1 | 5 | 1 | 251 | 251 | 251 | 250 | 249 | 250 | 249 | 249 | 250 | 250 | 250 | 251 |
| 2 | 1 | 10 | 63 | 64 | 65 | 65 | 65 | 66 | 66 | 66 | 66 | 66 | 66 | 66 |
| 3 | 6 | 6 | 95 | 95 | 95 | 95 | 95 | 95 | 95 | 95 | 95 | 96 | 96 | 96 |
| 4 | 2 | 17 | 62 | 64 | 65 | 65 | 66 | 66 | 66 | 67 | 67 | 67 | 67 | 67 |
| 5 | 13 | 30 | 200 | 200 | 200 | 200 | 200 | 200 | 200 | 200 | 200 | 200 | 200 | 200 |
| 6 | 22 | 5 | 249 | 247 | 247 | 246 | 246 | 246 | 247 | 247 | 248 | 249 | 250 | 250 |
| 7 | 8 | 9 | 161 | 161 | 161 | 161 | 161 | 161 | 161 | 161 | 161 | 161 | 161 | 161 |
| 8 | 8 | 10 | 241 | 248 | 253 | 5 | 28 | 54 | 68 | 75 | 76 | 69 | 58 | 54 |
| 9 | 5 | 7 | 220 | 220 | 220 | 220 | 220 | 220 | 220 | 220 | 220 | 220 | 220 | 220 |
| 10 | 14 | 9 | 238 | 243 | 245 | 246 | 248 | 253 | 15 | 44 | 64 | 73 | 77 | 79 |
| 11 | 49 | 31 | 35 | 67 | 63 | 72 | 64 | 25 | 14 | 9 | 4 | 253 | 241 | 221 |
| 12 | 17 | 10 | 17 | 22 | 23 | 23 | 21 | 18 | 15 | 14 | 11 | 9 | 8 | 8 |
| 13 | 3 | 38 | 60 | 62 | 63 | 64 | 64 | 64 | 65 | 66 | 66 | 66 | 68 | 71 |
| 14 | 12 | 14 | 90 | 91 | 91 | 92 | 92 | 92 | 92 | 93 | 93 | 93 | 94 | 94 |
| 15 | 9 | 13 | 66 | 71 | 72 | 74 | 74 | 69 | 49 | 16 | 254 | 248 | 248 | 248 |
| 16 | 31 | 35 | 238 | 248 | 255 | 2 | 10 | 23 | 21 | 12 | 6 | 254 | 229 | 189 |

| MODEL | dx | dy | θ1 | θ2 | θ3 | θ4 | θ5 | θ6 | θ7 | θ8 | θ9 | θ10 | θ11 | θ12 |
|---|---|---|---|---|---|---|---|---|---|---|---|---|---|---|
| 17 | 2 | 27 | 60 | 62 | 63 | 64 | 64 | 64 | 65 | 65 | 65 | 65 | 66 | 67 |
| 18 | 12 | 26 | 69 | 73 | 75 | 76 | 77 | 77 | 78 | 79 | 80 | 81 | 83 | 86 |
| 19 | 1 | 8 | 192 | 192 | 192 | 192 | 192 | 192 | 192 | 192 | 192 | 192 | 192 | 192 |
| 20 | 12 | 15 | 218 | 218 | 218 | 218 | 218 | 218 | 218 | 218 | 218 | 218 | 218 | 218 |
| 21 | 4 | 53 | 60 | 61 | 63 | 63 | 64 | 64 | 64 | 65 | 66 | 66 | 69 | 75 |
| 22 | 15 | 42 | 50 | 54 | 59 | 64 | 65 | 66 | 67 | 68 | 67 | 68 | 71 | 82 |
| 23 | 25 | 54 | 7 | 15 | 24 | 41 | 55 | 60 | 61 | 60 | 60 | 60 | 64 | 97 |
| 24 | 19 | 47 | 204 | 204 | 204 | 204 | 204 | 204 | 204 | 204 | 204 | 204 | 204 | 204 |
| 25 | 3 | 21 | 191 | 191 | 191 | 191 | 191 | 191 | 191 | 191 | 191 | 191 | 191 | 191 |
| 26 | 18 | 31 | 244 | 250 | 1 | 18 | 48 | 64 | 67 | 68 | 70 | 72 | 77 | 90 |
| 27 | 23 | 17 | 239 | 245 | 247 | 248 | 251 | 4 | 28 | 53 | 66 | 70 | 74 | 81 |
| 28 | 1 | 5 | 58 | 58 | 58 | 59 | 60 | 59 | 60 | 60 | 59 | 59 | 59 | 59 |
| 29 | 38 | 7 | 250 | 250 | 250 | 250 | 250 | 250 | 251 | 251 | 252 | 255 | 1 | 2 |
| 30 | 12 | 3 | 248 | 246 | 246 | 245 | 245 | 245 | 245 | 246 | 246 | 246 | 247 | 247 |
| 31 | 26 | 11 | 117 | 117 | 117 | 117 | 117 | 117 | 117 | 117 | 117 | 117 | 117 | 117 |
| 32 | 19 | 22 | 62 | 66 | 67 | 68 | 65 | 56 | 28 | 5 | 253 | 251 | 250 | 247 |
| 33 | 13 | 19 | 238 | 244 | 249 | 5 | 35 | 61 | 69 | 71 | 72 | 72 | 73 | 78 |
| 34 | 10 | 2 | 129 | 129 | 129 | 129 | 129 | 129 | 129 | 129 | 129 | 129 | 129 | 129 |
| 35 | 5 | 40 | 195 | 195 | 195 | 195 | 195 | 195 | 195 | 195 | 195 | 195 | 195 | 195 |
| 36 | 4 | 3 | 25 | 25 | 26 | 27 | 29 | 29 | 30 | 30 | 30 | 30 | 29 | 29 |
| 37 | 15 | 7 | 110 | 109 | 109 | 109 | 109 | 109 | 109 | 110 | 110 | 110 | 110 | 110 |
| 38 | 29 | 18 | 28 | 36 | 36 | 30 | 20 | 11 | 7 | 5 | 3 | 1 | 253 | 248 |
| 39 | 2 | 1 | 109 | 109 | 109 | 109 | 108 | 107 | 106 | 106 | 106 | 106 | 106 | 105 |
| 40 | 40 | 24 | 32 | 43 | 45 | 40 | 28 | 15 | 10 | 7 | 4 | 0 | 248 | 237 |
| 41 | 21 | 24 | 221 | 221 | 221 | 221 | 221 | 221 | 221 | 221 | 221 | 221 | 221 | 221 |
| 42 | 12 | 36 | 0 | 14 | 40 | 65 | 67 | 63 | 61 | 62 | 64 | 66 | 70 | 85 |
| 43 | 21 | 34 | 75 | 78 | 79 | 81 | 83 | 84 | 86 | 87 | 89 | 90 | 92 | 94 |
| 44 | 9 | 32 | 60 | 63 | 66 | 66 | 63 | 63 | 64 | 66 | 59 | 27 | 246 | 233 |
| 45 | 33 | 30 | 158 | 158 | 158 | 158 | 158 | 158 | 158 | 158 | 158 | 158 | 158 | 158 |
| 46 | 13 | 58 | 38 | 48 | 60 | 64 | 65 | 66 | 65 | 66 | 67 | 68 | 73 | 91 |
| 47 | 9 | 9 | 240 | 251 | 2 | 24 | 64 | 85 | 93 | 96 | 82 | 250 | 242 | 242 |
| 48 | 17 | 10 | 7 | 251 | 245 | 240 | 237 | 236 | 236 | 237 | 239 | 242 | 243 | 243 |
| 49 | 28 | 8 | 246 | 249 | 249 | 249 | 250 | 251 | 252 | 255 | 15 | 44 | 63 | 72 |
| 50 | 38 | 15 | 8 | 15 | 10 | 3 | 0 | 255 | 0 | 3 | 10 | 16 | 21 | 23 |
| 51 | 39 | 14 | 121 | 121 | 121 | 121 | 121 | 121 | 121 | 121 | 121 | 121 | 121 | 121 |
| 52 | 27 | 55 | 204 | 204 | 204 | 204 | 204 | 204 | 204 | 204 | 204 | 204 | 204 | 205 |
| 53 | 54 | 9 | 255 | 0 | 1 | 0 | 0 | 0 | 255 | 255 | 255 | 255 | 0 | 0 |
| 54 | 2 | 2 | 162 | 162 | 162 | 162 | 162 | 162 | 163 | 163 | 163 | 163 | 163 | 163 |
| 55 | 6 | 5 | 236 | 239 | 243 | 245 | 255 | 7 | 34 | 54 | 72 | 77 | 79 | 77 |

*FIG. 7A*

| MODEL | dx | dy | θ1 | θ2 | θ3 | θ4 | θ5 | θ6 | θ7 | θ8 | θ9 | θ10 | θ11 | θ12 |
|---|---|---|---|---|---|---|---|---|---|---|---|---|---|---|
| 56 | 10 | 10 | 47 | 49 | 45 | 33 | 17 | 13 | 17 | 26 | 36 | 44 | 43 | 38 |
| 57 | 37 | 42 | 42 | 49 | 53 | 56 | 58 | 51 | 31 | 13 | 7 | 1 | 246 | 227 |
| 58 | 15 | 30 | 65 | 68 | 69 | 67 | 67 | 69 | 66 | 47 | 8 | 252 | 255 | 255 |
| 59 | 22 | 39 | 61 | 62 | 64 | 63 | 61 | 59 | 51 | 27 | 8 | 254 | 248 | 237 |
| 60 | 15 | 13 | 74 | 81 | 84 | 87 | 85 | 59 | 252 | 245 | 244 | 245 | 247 | 248 |
| 61 | 29 | 28 | 240 | 246 | 247 | 249 | 255 | 21 | 51 | 64 | 68 | 70 | 77 | 97 |
| 62 | 9 | 54 | 194 | 194 | 194 | 194 | 194 | 194 | 194 | 194 | 194 | 194 | 194 | 194 |
| 63 | 23 | 5 | 136 | 136 | 136 | 136 | 136 | 136 | 136 | 136 | 136 | 136 | 136 | 136 |
| 64 | 15 | 14 | 237 | 245 | 250 | 5 | 42 | 77 | 89 | 94 | 92 | 13 | 245 | 245 |
| 65 | 26 | 40 | 241 | 248 | 251 | 2 | 31 | 56 | 63 | 66 | 68 | 70 | 77 | 100 |
| 66 | 6 | 5 | 80 | 81 | 79 | 72 | 40 | 19 | 255 | 249 | 245 | 245 | 244 | 245 |
| 67 | 23 | 20 | 99 | 99 | 99 | 99 | 99 | 99 | 99 | 99 | 100 | 100 | 100 | 100 |
| 68 | 11 | 47 | 50 | 54 | 63 | 65 | 64 | 64 | 65 | 70 | 73 | 67 | 51 | 23 |
| 69 | 19 | 24 | 246 | 247 | 249 | 3 | 32 | 65 | 74 | 77 | 80 | 82 | 89 | 103 |
| 70 | 9 | 22 | 66 | 70 | 71 | 70 | 69 | 70 | 72 | 67 | 34 | 250 | 244 | 244 |
| 71 | 23 | 37 | 211 | 211 | 211 | 211 | 211 | 211 | 211 | 211 | 211 | 211 | 211 | 211 |
| 72 | 21 | 19 | 16 | 25 | 28 | 31 | 38 | 42 | 42 | 36 | 28 | 21 | 18 | 16 |
| 73 | 29 | 27 | 52 | 58 | 62 | 62 | 54 | 36 | 12 | 3 | 255 | 250 | 241 | 228 |
| 74 | 57 | 34 | 21 | 56 | 50 | 64 | 53 | 19 | 13 | 10 | 7 | 4 | 254 | 244 |
| 75 | 40 | 56 | 240 | 250 | 254 | 10 | 39 | 58 | 61 | 61 | 60 | 59 | 61 | 91 |
| 76 | 27 | 13 | 243 | 242 | 241 | 240 | 240 | 240 | 242 | 240 | 241 | 241 | 242 | 241 |
| 77 | 19 | 49 | 38 | 43 | 50 | 59 | 62 | 60 | 62 | 64 | 65 | 66 | 70 | 89 |
| 78 | 7 | 16 | 23 | 39 | 48 | 56 | 60 | 62 | 64 | 65 | 68 | 68 | 67 | 68 |
| 79 | 23 | 14 | 63 | 69 | 68 | 56 | 19 | 252 | 247 | 246 | 245 | 244 | 239 | 229 |
| 80 | 13 | 18 | 63 | 67 | 64 | 51 | 22 | 6 | 3 | 13 | 34 | 56 | 64 | 66 |
| 81 | 16 | 32 | 72 | 76 | 68 | 15 | 246 | 254 | 33 | 65 | 74 | 78 | 85 | 104 |
| 82 | 24 | 60 | 39 | 41 | 42 | 53 | 57 | 59 | 60 | 55 | 53 | 53 | 53 | 106 |
| 83 | 10 | 26 | 243 | 253 | 22 | 60 | 69 | 64 | 57 | 60 | 65 | 71 | 81 | 96 |
| 84 | 14 | 18 | 165 | 165 | 165 | 165 | 165 | 165 | 165 | 165 | 165 | 165 | 165 | 165 |
| 85 | 13 | 30 | 175 | 175 | 175 | 175 | 175 | 175 | 175 | 175 | 175 | 175 | 175 | 175 |
| 86 | 8 | 21 | 60 | 66 | 69 | 70 | 70 | 69 | 69 | 71 | 74 | 77 | 81 | 84 |
| 87 | 7 | 28 | 185 | 185 | 185 | 185 | 185 | 185 | 185 | 185 | 185 | 185 | 185 | 185 |
| 88 | 22 | 57 | 26 | 33 | 41 | 54 | 60 | 62 | 62 | 62 | 61 | 61 | 64 | 92 |
| 89 | 2 | 1 | 52 | 52 | 51 | 45 | 24 | 24 | 16 | 16 | 14 | 14 | 13 | 15 |
| 90 | 22 | 14 | 126 | 126 | 126 | 126 | 126 | 126 | 126 | 126 | 127 | 127 | 127 | 127 |
| 91 | 18 | 39 | 31 | 34 | 36 | 42 | 54 | 58 | 61 | 62 | 61 | 61 | 67 | 85 |
| 92 | 7 | 18 | 207 | 207 | 207 | 207 | 207 | 207 | 207 | 207 | 207 | 207 | 207 | 207 |
| 93 | 13 | 4 | 2 | 3 | 3 | 6 | 8 | 9 | 11 | 12 | 16 | 22 | 25 | 27 |
| 94 | 31 | 48 | 202 | 202 | 202 | 202 | 202 | 202 | 202 | 202 | 202 | 202 | 202 | 202 |

*FIG. 7B*

| MODEL | dx | dy | θ1 | θ2 | θ3 | θ4 | θ5 | θ6 | θ7 | θ8 | θ9 | θ10 | θ11 | θ12 |
|---|---|---|---|---|---|---|---|---|---|---|---|---|---|---|
| 95 | 20 | 10 | 246 | 250 | 247 | 244 | 245 | 247 | 252 | 7 | 38 | 66 | 78 | 84 |
| 96 | 34 | 22 | 16 | 26 | 26 | 19 | 9 | 4 | 5 | 9 | 11 | 7 | 0 | 239 |
| 97 | 37 | 22 | 121 | 121 | 121 | 121 | 121 | 121 | 121 | 121 | 121 | 121 | 121 | 121 |
| 98 | 12 | 14 | 239 | 243 | 246 | 253 | 14 | 46 | 72 | 81 | 84 | 86 | 84 | 84 |
| 99 | 31 | 3 | 3 | 255 | 254 | 254 | 254 | 255 | 255 | 255 | 255 | 255 | 1 | 2 |
| 100 | 11 | 46 | 49 | 54 | 62 | 65 | 64 | 63 | 64 | 67 | 67 | 64 | 64 | 78 |
| 101 | 4 | 10 | 68 | 73 | 75 | 78 | 79 | 79 | 80 | 81 | 82 | 83 | 85 | 84 |
| 102 | 16 | 24 | 48 | 50 | 50 | 58 | 69 | 71 | 71 | 74 | 78 | 82 | 86 | 93 |
| 103 | 24 | 24 | 60 | 66 | 68 | 67 | 59 | 39 | 10 | 255 | 252 | 250 | 246 | 240 |
| 104 | 6 | 15 | 176 | 176 | 176 | 176 | 176 | 176 | 176 | 176 | 176 | 176 | 176 | 176 |
| 105 | 6 | 12 | 64 | 69 | 71 | 72 | 74 | 74 | 71 | 60 | 30 | 5 | 253 | 252 |
| 106 | 51 | 46 | 7 | 28 | 37 | 48 | 56 | 51 | 36 | 26 | 20 | 13 | 2 | 229 |
| 107 | 1 | 33 | 192 | 192 | 192 | 192 | 192 | 192 | 192 | 192 | 192 | 192 | 192 | 192 |
| 108 | 35 | 33 | 5 | 14 | 23 | 30 | 32 | 28 | 24 | 19 | 14 | 8 | 251 | 223 |
| 109 | 23 | 32 | 172 | 172 | 172 | 172 | 172 | 172 | 172 | 172 | 172 | 172 | 172 | 172 |
| 110 | 14 | 47 | 196 | 196 | 196 | 196 | 196 | 196 | 196 | 196 | 196 | 196 | 196 | 196 |
| 111 | 29 | 45 | 40 | 43 | 43 | 44 | 53 | 59 | 60 | 59 | 58 | 58 | 64 | 100 |
| 112 | 5 | 7 | 10 | 14 | 24 | 31 | 44 | 51 | 57 | 59 | 59 | 56 | 45 | 41 |
| 113 | 4 | 61 | 61 | 63 | 63 | 63 | 64 | 64 | 64 | 64 | 65 | 65 | 69 | 79 |
| 114 | 1 | 2 | 213 | 213 | 214 | 214 | 215 | 216 | 218 | 218 | 219 | 218 | 218 | 219 |
| 115 | 10 | 32 | 56 | 61 | 66 | 66 | 61 | 60 | 63 | 66 | 67 | 68 | 72 | 79 |
| 116 | 14 | 7 | 148 | 148 | 148 | 148 | 148 | 148 | 148 | 148 | 148 | 148 | 148 | 148 |
| 117 | 29 | 13 | 17 | 24 | 20 | 11 | 5 | 3 | 4 | 7 | 12 | 18 | 22 | 23 |
| 118 | 21 | 16 | 240 | 244 | 246 | 252 | 18 | 55 | 62 | 32 | 250 | 242 | 240 | 239 |
| 119 | 50 | 13 | 4 | 9 | 7 | 5 | 1 | 0 | 0 | 0 | 0 | 2 | 2 | 1 |
| 120 | 14 | 9 | 65 | 70 | 68 | 61 | 33 | 2 | 249 | 246 | 245 | 246 | 248 | 247 |
| 121 | 24 | 29 | 1 | 4 | 4 | 9 | 29 | 54 | 64 | 69 | 72 | 74 | 81 | 96 |
| 122 | 30 | 3 | 127 | 127 | 127 | 127 | 127 | 127 | 127 | 127 | 127 | 127 | 127 | 127 |
| 123 | 13 | 20 | 65 | 71 | 72 | 73 | 76 | 78 | 73 | 27 | 252 | 246 | 250 | 252 |
| 124 | 15 | 15 | 51 | 58 | 57 | 48 | 26 | 9 | 6 | 9 | 19 | 34 | 44 | 44 |
| 125 | 9 | 6 | 68 | 1 | 240 | 237 | 235 | 235 | 237 | 238 | 238 | 239 | 239 | 238 |
| 126 | 15 | 40 | 64 | 67 | 68 | 52 | 32 | 40 | 60 | 75 | 72 | 49 | 32 | 39 |
| 127 | 56 | 26 | 25 | 46 | 45 | 43 | 27 | 13 | 12 | 9 | 6 | 1 | 251 | 240 |
| 128 | 7 | 6 | 58 | 57 | 49 | 253 | 230 | 239 | 5 | 20 | 41 | 57 | 44 | 22 |
| 129 | 40 | 37 | 233 | 239 | 244 | 249 | 4 | 17 | 34 | 34 | 27 | 19 | 250 | 188 |
| 130 | 14 | 25 | 53 | 60 | 61 | 50 | 37 | 34 | 37 | 52 | 60 | 62 | 59 | 65 |
| 131 | 23 | 33 | 9 | 14 | 17 | 33 | 57 | 72 | 71 | 56 | 27 | 4 | 3 | 249 |
| 132 | 16 | 54 | 54 | 57 | 64 | 63 | 63 | 63 | 64 | 76 | 89 | 59 | 3 | 248 |
| 133 | 34 | 20 | 33 | 39 | 21 | 254 | 247 | 246 | 250 | 1 | 9 | 16 | 28 | 30 |

*FIG. 7C*

| MODEL | dx | dy | θ1 | θ2 | θ3 | θ4 | θ5 | θ6 | θ7 | θ8 | θ9 | θ10 | θ11 | θ12 |
|---|---|---|---|---|---|---|---|---|---|---|---|---|---|---|
| 134 | 49 | 7 | 140 | 160 | 164 | 167 | 162 | 160 | 157 | 154 | 120 | 108 | 115 | 119 |
| 135 | 20 | 13 | 52 | 51 | 31 | 253 | 243 | 243 | 247 | 250 | 7 | 32 | 37 | 37 |
| 136 | 10 | 15 | 59 | 58 | 49 | 20 | 2 | 12 | 40 | 57 | 63 | 64 | 45 | 40 |
| 137 | 46 | 54 | 230 | 239 | 245 | 255 | 11 | 22 | 14 | 1 | 251 | 247 | 237 | 215 |
| 138 | 30 | 50 | 49 | 50 | 49 | 47 | 53 | 57 | 59 | 58 | 56 | 55 | 63 | 115 |
| 139 | 34 | 22 | 145 | 145 | 145 | 145 | 145 | 145 | 145 | 145 | 145 | 145 | 145 | 145 |
| 140 | 26 | 33 | 48 | 56 | 62 | 58 | 51 | 41 | 30 | 33 | 38 | 44 | 57 | 85 |
| 141 | 24 | 53 | 180 | 180 | 180 | 180 | 180 | 180 | 180 | 180 | 180 | 180 | 180 | 180 |

HANDWRITTEN CHARACTER RECOGNITION USING MULTI-RESOLUTION MODELS

FIELD OF THE INVENTION

The present invention relates generally to handwritten character recognition using multi-resolution models.

BACKGROUND OF THE INVENTION

Asian languages, like Chinese and Japanese, have several thousand characters. In China, where the character set used is Simplified Chinese, the Guo Biao (GB) coding standard specifies nearly 6800 characters. The GB coding standard specifies two byte codes for all Simplified Chinese characters supported in today's computer systems. In Taiwan and Hong Kong, where the character set used is Traditional Chinese, the Big 5 coding standard specifies nearly 13000 characters. The Big 5 coding standard specifies two byte codes for all Traditional Chinese characters supported in today's computer systems. The Japan Industrial Standard 208 (JIS208) coding standard specifies nearly 6300 Japanese Kanji characters. When the number of characters is so large, keyboard entry of characters becomes awkward. In such cases, an input method that is based on handwriting recognition is an attractive alternative.

Handwriting recognition systems can be implemented by comparing the handwriting input with a collection of models for all the characters of interest in the vocabulary, computing a distance measurement between the input and each one of the stored models and selecting one or more candidates from the models that have the least distance to the handwritten input. There are several research results in handwriting recognition that can be applied to recognition of Chinese and Japanese Kanji characters. In a first method, a hierarchical representation is used to model characters. In this approach, characters are represented as a collection of smaller units called radicals, written in a specific order. The radicals themselves are modeled as a sequence of strokes. Recognition typically involves segmenting the handwritten input into component radicals and then comparing those with stored models for radicals. While this method efficiently stores character models, the process of segmentation before recognition limits the accuracy of the recognizer.

In a second method, models are stored for entire characters. Since this method does not rely on segmentation of the input into radicals before recognition, it generally gives a more accurate recognizer. The amount of memory required to store the character models and the computational requirements, however, are relatively large and can be a severe limitation in some applications.

In addition, handwriting recognition systems for Chinese and Japanese Kanji characters should address variations in the order of strokes and variations in the number of strokes that are used to write the same character. One method that is commonly used to deal with variations in stroke order is to re-order the strokes based on some heuristics. By doing so, the actual time order of strokes that were written is discarded. The drawback with such an approach is that the problem of re-ordering strokes is a difficult one and is often the source of errors in the recognition system.

Another method is to maintain a single model for each character and to generate several stroke order variations during run time of the recognition system. This approach, however, would require additional computing resources to generate stroke order variations from a base character model.

Other methods include maintaining a single model for each character and generating new models at run time by connecting one or more strokes, or alternatively, using more powerful matching algorithms based on dynamic programming to compare the handwritten input with stored character models, even if they differ in the number of strokes. Both these techniques, however, require additional computational power during run time of the recognition system.

There is a proliferation of small hand-held devices in today's market place. These devices perform functions ranging from maintaining address and contact information to more advanced functions like paging and cellular telephony. In many of these hand-held devices, the processing power available is very small compared to a traditional personal computer. Thus, the algorithms used for handwriting recognition on a personal computer would not be of much use on most of these hand-held devices.

Thus, a need exists for a handwriting recognizer that has very high processing speed, modest memory requirements and high accuracy when characters are written stroke-by-stroke or with limited stroke connectivity, as well as addressing variations in the order of strokes and variations in the number of strokes that are used to write the same character.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

A method for handwritten character recognition using multi-resolution models is described herein. The present invention provides a novel technique for recognizing handwritten characters (e.g., Chinese and Japanese Kanji characters) that has a very high processing speed, modest memory requirements and high accuracy when characters are written stroke-by-stroke or with limited stroke connectivity. The present invention also addresses variations in the order of strokes and variations in the number of strokes that are used to write the same character. The present invention describes deriving a set of character models and a set of stroke models and using the set of character models and the set of stroke models to facilitate handwriting recognition.

In a preferred embodiment, models for characters are stored at variable resolution. Characters are modeled as a concatenation (i.e., set or sequence) of strokes. It is convenient to consider a character as, but not limited to, a unitary element of a written language represented as a single stroke or a sequence of strokes. A stroke is a segment of ink starting from when a stylus touches a writing surface (e.g., a digitizing tablet), to when the stylus is lifted from the writing surface. Using a clustering procedure (or by other means), a small number of stroke models are derived. It is convenient to consider a stroke model as, but not limited to, a template of continuous ink. These stroke models are in turn used to store models for characters in a compact form. It is convenient to consider a character model as, but not limited to, a representation of a character as a sequence of stroke models. By varying the number of stroke models and data used to derive the stroke models, several sets of stroke models are derived. When the number of stroke models increases, the resolution for representing strokes also increases. Thus, character models can be stored at varying resolutions depending on the need. The examples described below specifically refer to Chinese and Japanese Kanji characters. The present invention, however, is applicable to handwritten characters and/or input written in any language.

Figure 1:
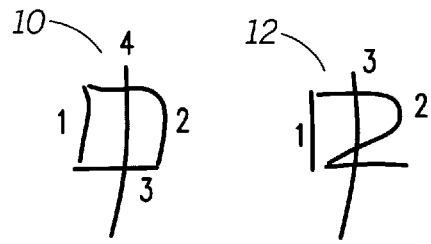
FIG. 1 illustrates a variation in the number of strokes.

The most basic unit of handwritten Chinese and Japanese Kanji characters is a stroke. For each character, a standard number of strokes is specified. Similar to cursive writing in English, consecutive strokes are often connected while writing Chinese and Japanese Kanji characters. For example, FIG. 1 shows two models 10 and 12 of a Chinese character represented by different numbers of strokes. The first model 10 shows the Chinese character written with four strokes, which is the standard number of strokes for that character. The second model 12 shows a common writing style where the Chinese character is written using only three strokes.

When the number of strokes used to write a character conforms to the standard number of strokes for that character, the writing style is referred to as a "print" or a "stroke-by-stroke" style of writing. When two or more consecutive strokes are connected, the writing style is referred to as a "cursive" or a "connected-stroke" style of writing. The first model 10 of the Chinese character shows the print style while the second model 12 shows a cursive style of writing the same character. In this particular example, strokes labeled 2 and 3 in the first model 10 are merged together to result in a single stroke labeled 2 in the second model 12.

Strokes are represented by a set of features. The following description presents a combination of two types of features, one based on the size of the stroke and the other based on the shape of the stroke. Handwritten input that is collected from a digitizing tablet is first preprocessed before stroke features are extracted. A digitizing tablet typically collects and reports ink as a sequence of points. For each point, the x and y coordinates of the stylus tip and an associated stylus up/down state are reported. Preprocessing involves the following steps: size normalization, smoothing, over-sampling and box filtering.

The first step of preprocessing is size normalization. The input ink is scaled so that the input ink fits in a standard sized box. The aspect ratio of the input is preserved during normalization. The box size that is used for normalization is 16383, so that fourteen bits are sufficient to represent a coordinate value. A box size of 16383 is used so that there is sufficient resolution for the smoothing phase of preprocessing (step two). There is no special significance for the size of the box to be 16383, except that it fits in fourteen bytes (the largest unsigned fourteen bit number is 16383). Typically, ink coordinates collected from a digitizing tablet lie in the range of 0 to 500. The box size of 16383 is selected so that it is much larger than typical coordinate values. This makes the step of smoothing more effective.

The second step of preprocessing is smoothing. Smoothing is performed by replacing each point by a weighted average of the current point in time, two points immediately preceding the current point in time and two points immediately following the current point in time. Mathematically, this operation can be represented as $$x_{i,new} = \frac{\sum_{j=i-2}^{i+2} w_j \times x_j}{\sum_{j=i-2}^{i+2} w_j} \quad \text{(EQ. 1)}$$

where $w_j$ are the weighting terms used to compute the weighted average. The vector of weights that is used is $$\begin{bmatrix} w_{i-2} \\ w_{i-1} \\ w_i \\ w_{i+1} \\ w_{i+2} \end{bmatrix} = \begin{bmatrix} 1 \\ 2 \\ 2 \\ 2 \\ 1 \end{bmatrix} \quad \text{(EQ. 2)}$$

Note that the weights are chosen in such a way that multiplication and division in Equation 1 is implemented using shifts in a computer. The denominator in Equation 1 adds up to eight, which is implemented as a right shift by three bits.

The third step of preprocessing is over-sampling. Over-sampling is performed by linearly interpolating three points between every pair of consecutive points.

The fourth step of preprocessing is box filtering. Box filtering is performed by starting with the first point and defining a box with a fixed size around the first point. Any subsequent point that lies within this box is simply discarded. The first point that lies outside the box is retained and the box is moved so that the box is centered around the new point. This box filtering process is repeated until all points in the original ink are considered. Box filtering is useful in removing jitters in the ink. Box filtering has the added benefit of producing consecutive ink points that are more or less equidistant in space.

Figure 2:
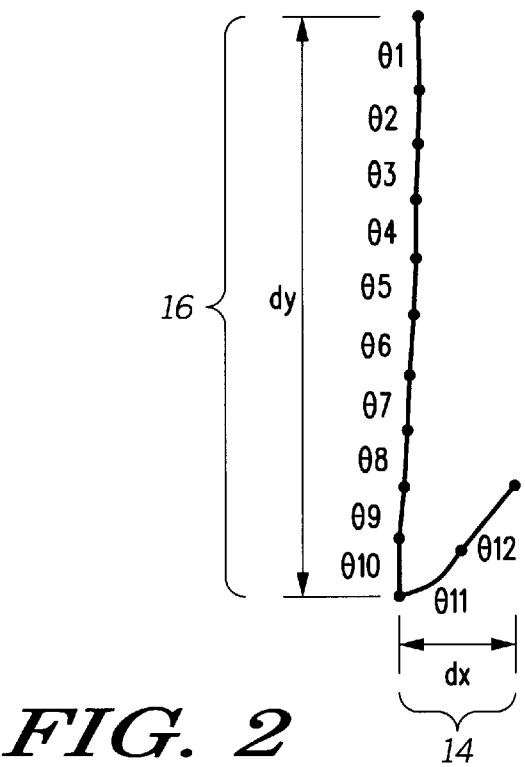
FIG. 2 illustrates fourteen features that are extracted to represent strokes in a preferred embodiment of the present invention.

After preprocessing, fourteen features are extracted for each stroke in the input. It is important to note that the number of features extracted is not limited to fourteen, but can be any number. FIG. 2 illustrates the fourteen stroke features that are extracted to represent a stroke in the preferred embodiment of the present invention. In FIG. 2, dx 14 and dy 16 are the size features of the stroke and are the extent of the stroke in the x and y dimensions. The remaining twelve features are based on the shape of the stroke. The stroke is divided into twelve segments of approximately equal arc lengths. Dividing each stroke into twelve segments is computationally inexpensive since box filtering during preprocessing produces consecutive ink points that are approximately equidistant in space. The twelve shape features are the angles of the straight lines joining the end points of each of the twelve segments and are shown as [θ1, θ2, ..., θ12] in FIG. 2. Both the size features and the shape features are scaled to range from 0 to 255, so that each feature value can be stored using one byte. Thus, a stroke with fourteen features can be stored using fourteen bytes. It is important to note that features of the stroke are translation invariant, since there is no feature that is based on the absolute position of the stroke within a character.

Various metrics can be used to measure the similarity between two strokes. Euclidean or Manhattan distance between the feature vector of the two strokes are examples of metrics that can be used. In this example, the present invention uses the Manhattan metric to measure the similarity between strokes. If two strokes have feature vectors [dx dy θ1, θ2, ..., θ12] and $$[\bar{dx} \ \bar{dy} \ \bar{\theta}1, \bar{\theta}2, ..., \bar{\theta}12]$$

respectively, the Manhattan distance is $$d = |dx - \bar{dx}| + |dy - \bar{dy}| + \sum_{i=1}^{12} |\theta_i - \bar{\theta}_i| \quad \text{(EQ. 3)}$$

It is important to note that a weighted Manhattan distance can also be used. For instance, it might be desirable to weigh the shape features and the size features differently.

Characters are made up of one or more strokes, written in a specific order. Quantitatively, a character can be expressed using a feature vector that is a concatenation of the feature vectors of each of the strokes that make up the character.

Figure 3:
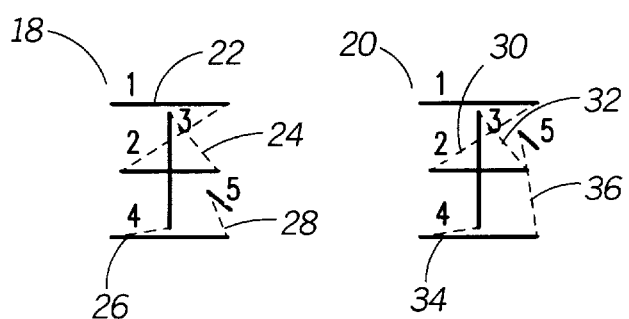
FIG. 3 illustrates a representation of a pair of Chinese characters.

There are several groups of characters in the Chinese and Japanese language that look quite similar. For example, FIG. 3 illustrates a representation of a pair of Chinese characters 18 and 20, that look quite similar. Since the features used to represent a stroke do not encode any information about the position of the stroke within the character, the feature vector for the two characters 18 and 20 shown in FIG. 3 is exactly the same. As shown, the present invention adds features to distinguish such groups of similar looking characters by considering the straight line joining the end point of every stroke with the start point of the next stroke as additional, albeit fictitious, strokes. Thus, in the example shown in FIG. 3, four additional straight line strokes 22, 24, 26, 28 and 30, 32, 34, 36, respectively, are included in the representation of the characters and illustrated by dotted lines.

The straight line stroke 28 or 36 inserted between strokes 4 and 5 provides a distinction between the two characters shown in FIG. 3. When there are n strokes in a handwritten character, n−1 straight line strokes need to be inserted between every pair of consecutive strokes. Since there are fourteen features for each stroke, the number of features used to represent a character with n strokes is 14(2n−1). Note that the feature vector of a handwritten character is dependent on the order in which the strokes are written. A character written with the same set of strokes but using different stroke orders will result in different feature vectors.

Two handwritten characters that have the same number of strokes can be quantitatively compared by summing up the stroke distances between the corresponding strokes in the two characters. While computing the distance measurement between two characters, the straight line strokes inserted between every pair of consecutive strokes are treated in the same way as the real strokes that are written.

Character models for each character are derived by performing a statistical analysis of handwritten samples collected from different writers. The present invention models two major variations in handwritten Chinese and Japanese Kanji characters: variation in the number of strokes used to write the character and variation in the order in which strokes are written.

Technically, any character can be written using a single stroke, irrespective of the standard number of strokes prescribed for that character. In practice, however, strokes are not connected at random and a definite pattern of stroke connectivity can be found. Referring back to FIG. 1, FIG. 1 shows an example of a Chinese character written with a different number of strokes. As stated previously, the first model 10 of the Chinese character is written using the standard number of strokes which is four, while the second model 12 shows a commonly used writing style where only three strokes are used to write the Chinese character. By analyzing handwritten samples collected from different writers, the most commonly used number of strokes for each character is obtained and this information is used to create models for characters.

Two handwritten samples of the same character written with the same number of strokes can still differ in the order in which strokes are written. Another variation comes from cursive writing, where two or more sets of strokes are connected and written as a single stroke. In such a case, additional variation is introduced by the location of the stroke connections. To create character models to account for variations in stroke order and stroke connectivity patterns, once again handwritten samples from different writers are analyzed to extract some commonly used writing styles. This is done using well known clustering analysis techniques. For example, a Distributor Algorithm is a type of a clustering procedure. In the Distributor Algorithm, each sample is initially randomly assigned to one of K clusters, where the number of clusters K is decided a priori. A measure of how good the clustering is, F, is expressed by the following equation: K $$F = \sum_{k=1}^{K} \frac{1}{S_k - 1} \sum_{p,q \in C_k} d(p, q) \quad \text{(EQ. 4)}$$

In Equation 4, Sk is the number of samples in the kth cluster, Ck refers to the kth cluster, p and q represent two generic samples in the kth cluster, and d(p,q) is the distance between samples p and q. During one cycle or epoch of clustering, each sample is moved from its current cluster to the cluster which results in the maximum decrease in "goodness" measure F shown in Equation 4. If by moving a sample to any other cluster does not produce a decrease in the value of F, then that sample is simply not moved to a new cluster. At the end of one epoch, the number of samples that have been moved is checked. If the number of samples moved is greater than zero, then another epoch of clustering is started. If the number of moves at the end of an epoch is zero, the clustering process is stopped. At the end of clustering, all similar samples are collected in the same cluster, where similarity is defined in terms of the distance d(p,q) between samples. A representative sample from each cluster is then chosen as a character model. Thus, K character models are created, where K is the number of clusters used in the clustering algorithm.

The choice of the number of models for each character is a crucial one. Having a lot of models will allow for many different writing styles to be recognized. Having a lot of models, however, generally implies large storage and computational requirements. The present invention uses two heuristics to limit the number of models that are created for each character. Using the first heuristic, several values of K are tried starting from one and increasing K each time. When the score F, properly normalized, goes below a set threshold, the clustering process is stopped and the current value of K is used. Using the second heuristic, a maximum limit on K is forced for each character. Even if the score F, properly normalized, is above the set threshold, the number of clusters is never allowed to exceed the maximum limit. By analyzing handwritten samples from different writers, models for handwritten Simplified and Traditional characters are created. In addition to the standard number of strokes, variations having up to one stroke connection are also modeled wherever possible.

Figure 4:
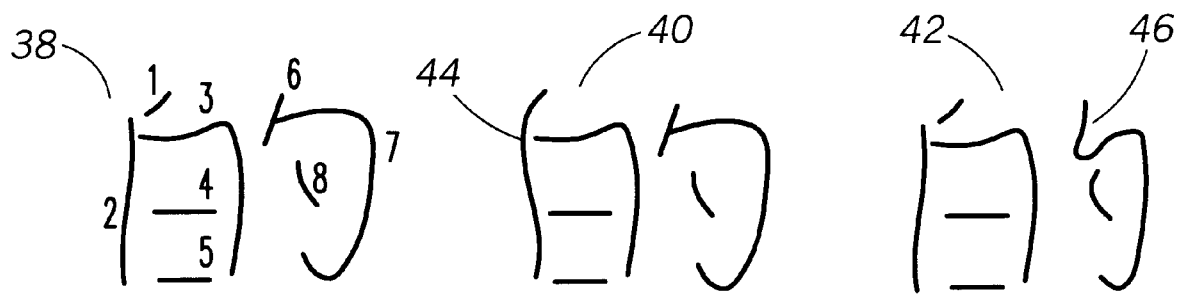
FIG. 4 illustrates an example of stroke number variations in character models.

FIG. 4 illustrates an example of stroke number variations in character models. A first model 38 in FIG. 4 shows a Chinese character written using eight strokes, which is the standard number of strokes for that character. A second model 40 and a third model 42 of FIG. 4 show the same Chinese character written with seven strokes. Although the second model 40 and the third model 42 have the same number of strokes, they differ in the location of the stroke connections. In the second model 40, strokes labeled 1 and 2 in the first model 38 are connected and written as a single stroke 44. In the third model 42, strokes labeled 6 and 7 in the first model 38 are connected and written as a single stroke 46.

Figure 5:
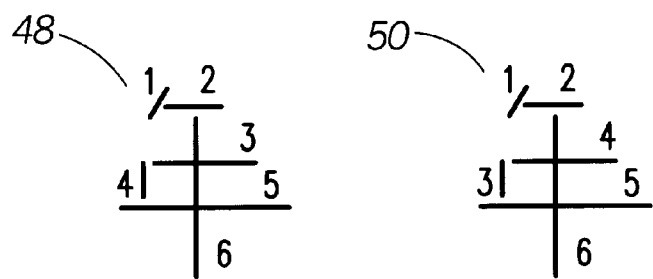
FIG. 5 illustrates an example of stroke order variations in character models.

FIG. 5 illustrates an example of stroke order variation in character models. FIG. 5 shows two models 48 and 50 for a Chinese character with six strokes. The two models 48 and 50 differ in the order in which strokes labeled 3 and 4 are written.

In a handwriting recognition system, character models are stored for all characters of interest in the vocabulary. In order to store a character model the features for all the strokes in the model need to be stored. Therefore, the amount of memory needed to store all character models is large. To address this issue, the present invention creates a small number of models for strokes, and character models are expressed in terms of the stroke models. Thus, after handwritten input is received, stokes are extracted from the handwritten input. A set of features is computed for each stroke in the handwritten input. Character models are stored for a plurality of characters. At least one character model is comprised of strokes selected from at least one set of stroke models. Finally, a distance measurement is computed between strokes extracted from the handwritten input and strokes of at least one character model.

Stroke models are derived by a clustering analysis of strokes collected from the character models as described above. The K-means clustering algorithm is used to create stroke models. Other clustering algorithms, however, may also be used to obtain similar results. In order to better model strokes that are rare, the present invention uses an incremental clustering approach wherein a predetermined number of stroke models are derived. A distance measurement between a stroke and a nearest stroke model is computed for each stroke and the strokes are sorted in increasing order based on this distance measurement. Then, a fixed percentage of strokes that have the highest number of modeling errors are separated. The fixed percentage of strokes that have the highest number of modeling errors are used to derive additional stroke models by clustering. For instance, the last fifty percent of the data in the sorted list can be used to derive additional stroke models. Separating a fixed percentage of strokes that have the highest number of modeling errors and using the fixed percentage of strokes to derive additional stroke models by clustering can be repeated more than once.

Figures 6A, 6B:
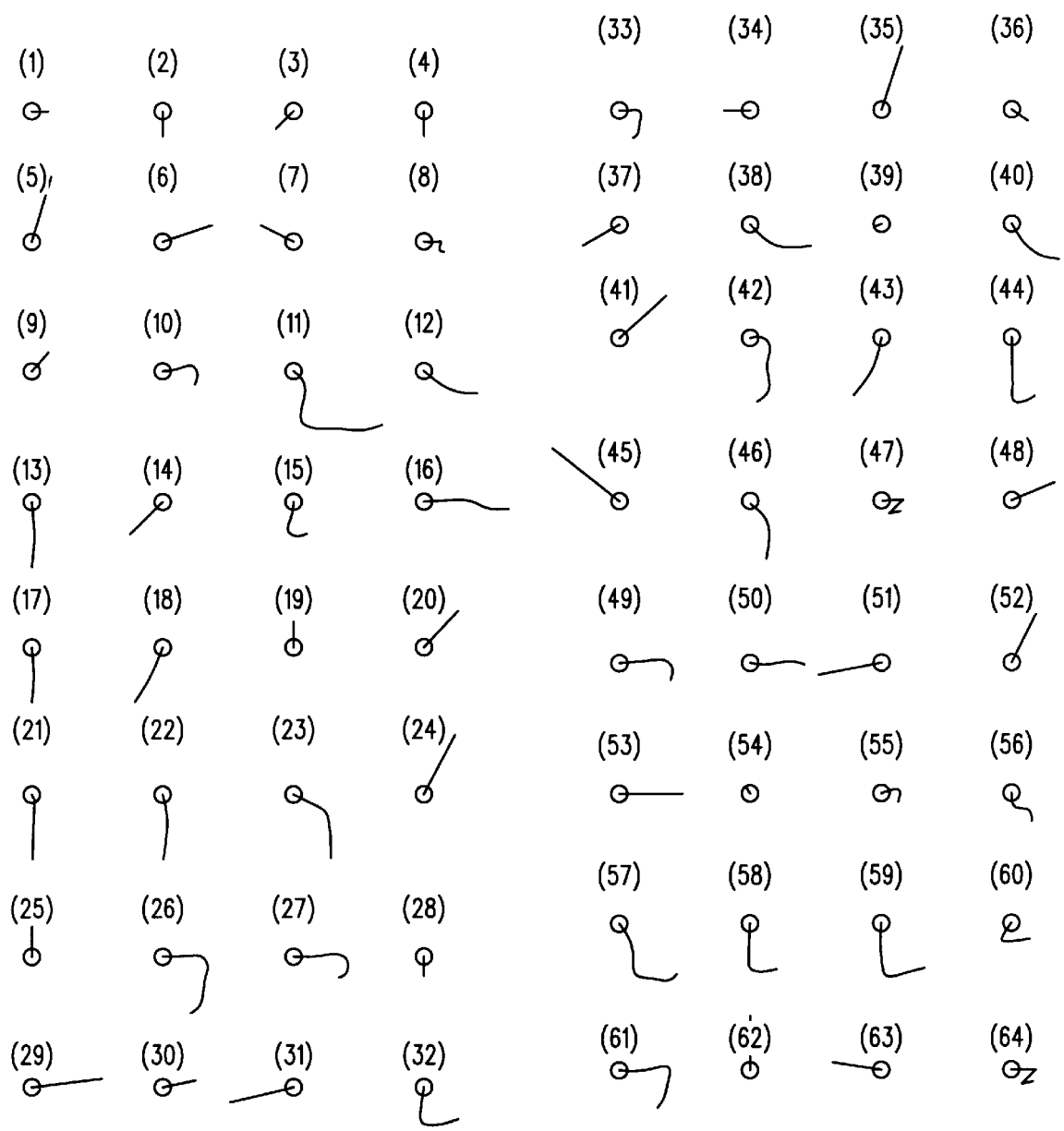
FIG. 6 illustrates a pictorial depiction of stroke models according to the preferred embodiment of the present invention.
Figures 6C, 6D:
Figures 6E, 7:
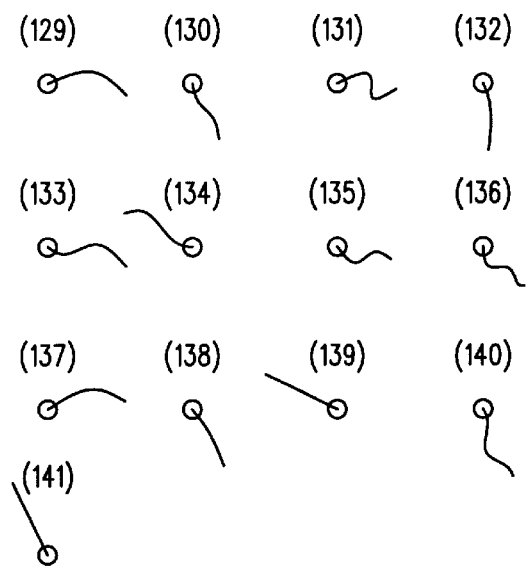
FIG. 7 illustrates a table depicting features of stroke models according to the preferred embodiment of the present invention.

In one experiment, models were created for Simplified and Traditional Chinese characters using the standard number of strokes and using one stroke connection. At first, thirty-eight stroke models were created, and the number of stroke models was progressively increased to eighty-five, one hundred and twenty-five, and finally one hundred and forty-one. The results of the experiment are shown in two different ways. FIG. 6 shows a pictorial version of the one hundred and forty-one stroke models. All the stroke models are drawn to the same scale and the small circle signifies the start of the stroke. The actual features of the one hundred and forty-one stroke models are shown in FIG. 7. The first two features are the x and y dimensions of the stroke, and the remaining twelve features are the angles scaled so that they range from 0 to 255. It is important to note that straight line strokes that are artificially inserted between stylus down strokes are also used to create stroke models. No distinction is made between stylus down and stylus up straight line strokes, thus allowing models to be shared between stylus down and stylus up straight line strokes.

Machine recognition of handwritten characters with a large number of strokes is generally easier than recognition of characters with a small number of strokes. Machine recognition of handwritten characters with a large number of strokes is generally easier because, the more the number of strokes, the less confusing the character is with other characters. Since characters with a larger number of strokes are generally easier to recognize when compared to characters with a smaller number of strokes, it is fair to expect that the resolution needed to represent character models can be made to depend on the number of strokes in the character. Models for characters with a large number of strokes are stored at a low resolution, thus saving memory and processing time to recognize the character.

A first embodiment of creating multi-resolution models is to have several sets of stroke models which are based on the number of strokes in the characters that are being modeled. After models for a plurality of characters are derived, character models are grouped into groups. For example, character models are classified into three groups, wherein the number of strokes in the character model within each group lies within a specified range. Character models with a small number of strokes, between 1 and 5 strokes, fall into a first group. Characters models with a medium number of strokes, between 6 and 10, fall into a second group. Finally, all character models with more than 10 strokes fall into a third group. Three separate sets of stroke models are created based on the stroke data extracted from each of the three groups of character models using the clustering technique mentioned above. Since the number of strokes for any character model in the first group is less than the number of strokes for any character model in the second group, the number of stroke models in the first set is greater than the number of strokes models in the second set. In the same respect, since the number of strokes for any character model in the second group is less than the number of strokes for any character model in the third group, the number of stroke models in the second set is greater than the number of stroke models in the third set. Thus, the resolution in representing character models in terms of the stroke models is directly related to the number of stroke models. The higher the number of stroke models, the higher the resolution.

The number of stroke models created for each group of character models is inversely related to the number of strokes in the character models in the group. For each character model, the set of stroke models for that group of characters is selected. For each stroke in each character model in a group, an index of the stroke model that best approximates the stroke is stored.

In the example above, since the first group has the least number of strokes, the character models can be represented with a higher resolution by creating a larger number of stroke models. The third group has the largest number of strokes, thus a small number of stroke models will suffice to represent the character models in this group. In the example above, character models are classified into three groups just to illustrate the idea of multi-resolution models. From the foregoing explanation, it is obvious to a person of ordinary skill in the art to see how multi-resolution models can be created with more than three groups. In the extreme case, for each possible number of strokes, a separate set of stroke models can be created.

A second embodiment of creating multi-resolution models is to store stroke features directly whenever the distance measurement between a stroke and the nearest stroke model exceeds a threshold. This method is particularly useful to model the outliner strokes which cannot be modeled well with any of the stroke models.

In the preferred embodiment of the invention, for character models with a number of strokes being less than three, stroke models are not used at all. Instead of stroke models, the fourteen features for each stroke in each character model is stored directly. For character models with three or more strokes, the 141 stroke models shown in FIG. 6 are used to represent the strokes.

Figures 7D, 8:
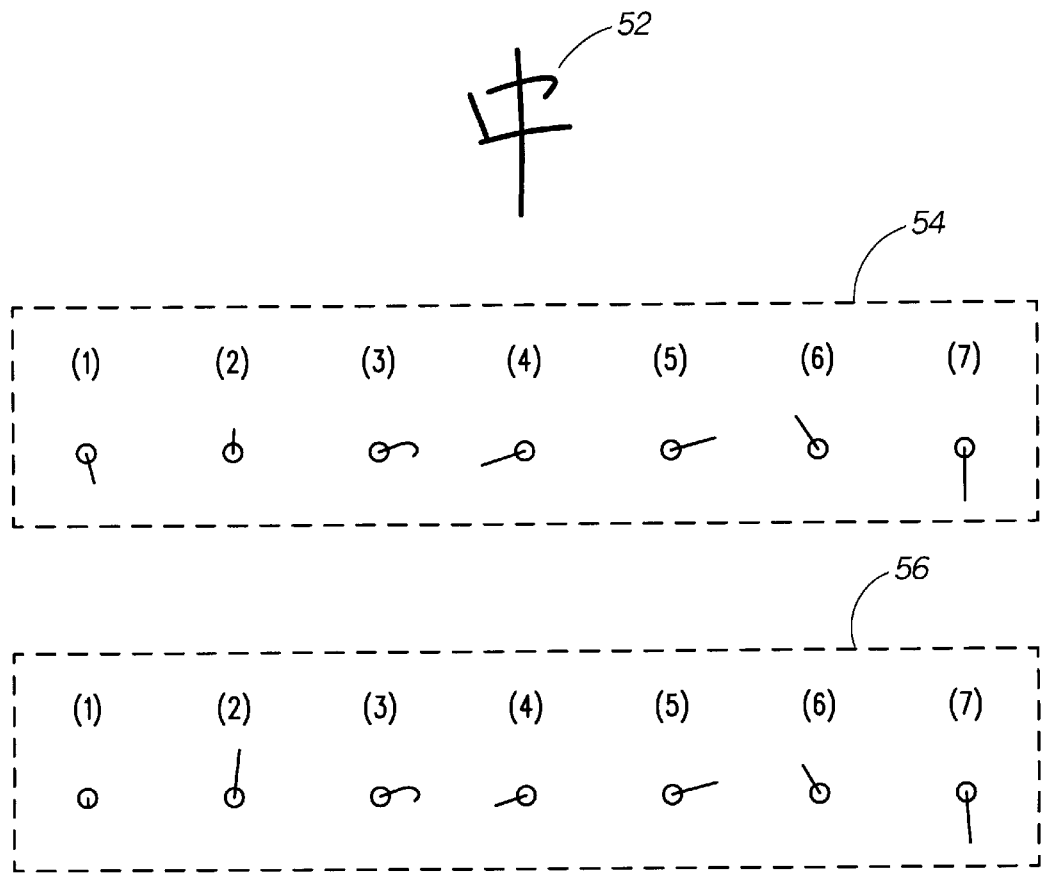
FIG. 8 illustrates an example showing how strokes in a character model are represented by their nearest stroke model according to the preferred embodiment of the present invention.

FIG. 8 illustrates an example showing how strokes in a character model are represented by their nearest stroke model according to the preferred embodiment of the present invention. The character model 52 shown in FIG. 8 has four stylus down strokes, giving a total of seven strokes including the straight line strokes inserted between consecutive stylus down strokes. Each of the seven strokes in the model 52 is shown individually in set 54, The nearest stroke model for each stroke from among the 141 stroke models shown in FIG. 6 is shown in set 56. Since the number of stroke models is less than 256, the stroke models are indexed using a single byte. Therefore, the character model shown in FIG. 8 is represented using seven bytes. If the stroke features were to be stored directly, about 98 bytes would be needed to store the character model.

As mentioned above, a handwriting recognition system for Chinese and Japanese Kanji characters must address the following two issues: variations in the order of strokes that are used to write the same character and variations in the number of strokes that are used to write the same character. To address this issue, the present invention stores multiple character models for each character to account for variations in writing style, so that commonly used stroke connections are considered. The present invention has determined commonly used stroke connections by a statistical analysis of a large number of handwritten samples from different writers.

Figure 9:
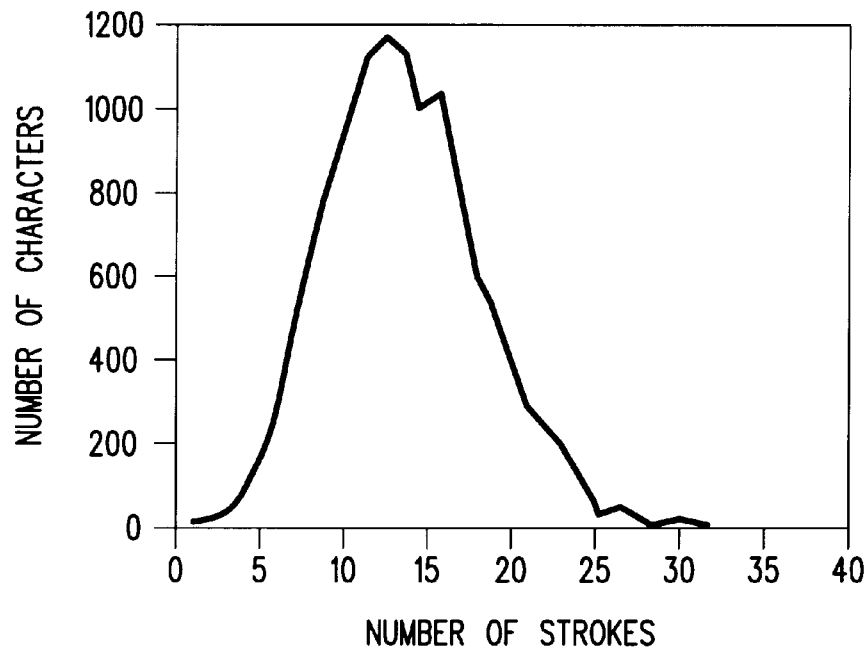
FIG. 9 illustrates a graph plotting a number of characters versus a standard number of strokes for Traditional Chinese characters.

Models are stored for characters written with the standard number of strokes and with one stroke less than the standard number of strokes. The processing time to recognize one character depends on the number of strokes in the handwritten input. The processing time is relatively small when the number of strokes written is either too small or too large. This is because of the distribution of the number of strokes in Simplified and Traditional Chinese characters. FIG. 9 illustrates a graph of the number of characters versus the standard number of strokes for Traditional Chinese characters.

For Traditional Chinese, the standard number of strokes varies from one to thirty-six. As shown in FIG. 9, the number of characters peaks at twelve strokes. When the number of strokes in the handwritten input is smaller than twelve or larger than twelve, then the number of character models to compare against will correspondingly be smaller. Intuitively, the processing time should depend on the total number of strokes that are being compared, which is the product of the number of character models and the number of strokes in each model. For the distribution shown in FIG. 9, the total number of strokes is largest for characters with fifteen strokes. Thus, the processing time for handwritten input with about fifteen strokes is expected to be the most.

Figure 10:
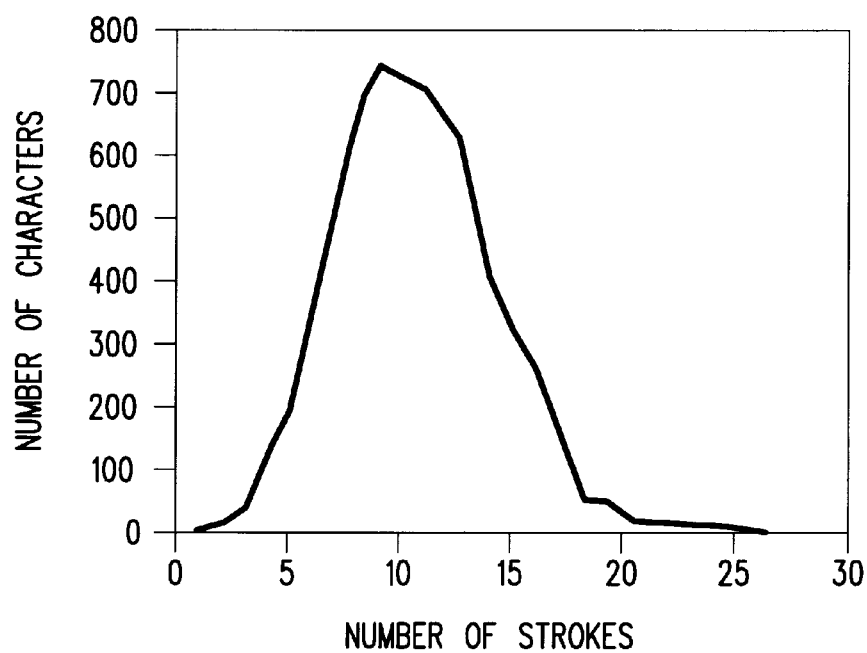
FIG. 10 illustrates a graph plotting a number of characters versus a standard number of strokes for Simplified Chinese characters.

A similar distribution of the standard number of strokes for Simplified Chinese characters is shown in FIG. 10. FIG. 10 illustrates a graph of the number of characters versus the standard number of strokes for Simplified Chinese characters. For Simplified Chinese, the number of strokes varies from one to thirty and the number of characters peaks at nine strokes. The worst case for processing time is when the handwritten input has eleven strokes. Recall that strokes within character models are stored by indexing them in terms of a small number of stroke models. This substantially reduces the processing time to recognize a handwritten input as follows. For each stroke in the input, the distance measurement to all of the stroke models is computed and stored. If there are m strokes in the input and n stroke models, then m×n distances are computed and stored in a distance matrix. The distance measurement between the handwritten input and a character model is computed by summing up the distance measurements between corresponding strokes in the input and model. Each stroke in the character model is indexed in terms of the n stroke models, and its distance measurement from the corresponding stroke in the input is read from the pre-computed distance matrix. Thus, the distance measurement between the input and stored character models is computed in a very fast manner. Use of multi-resolution character models does not affect the processing speed since the distance matrix mentioned above is computed for only one set of stroke models.

Figure 11:
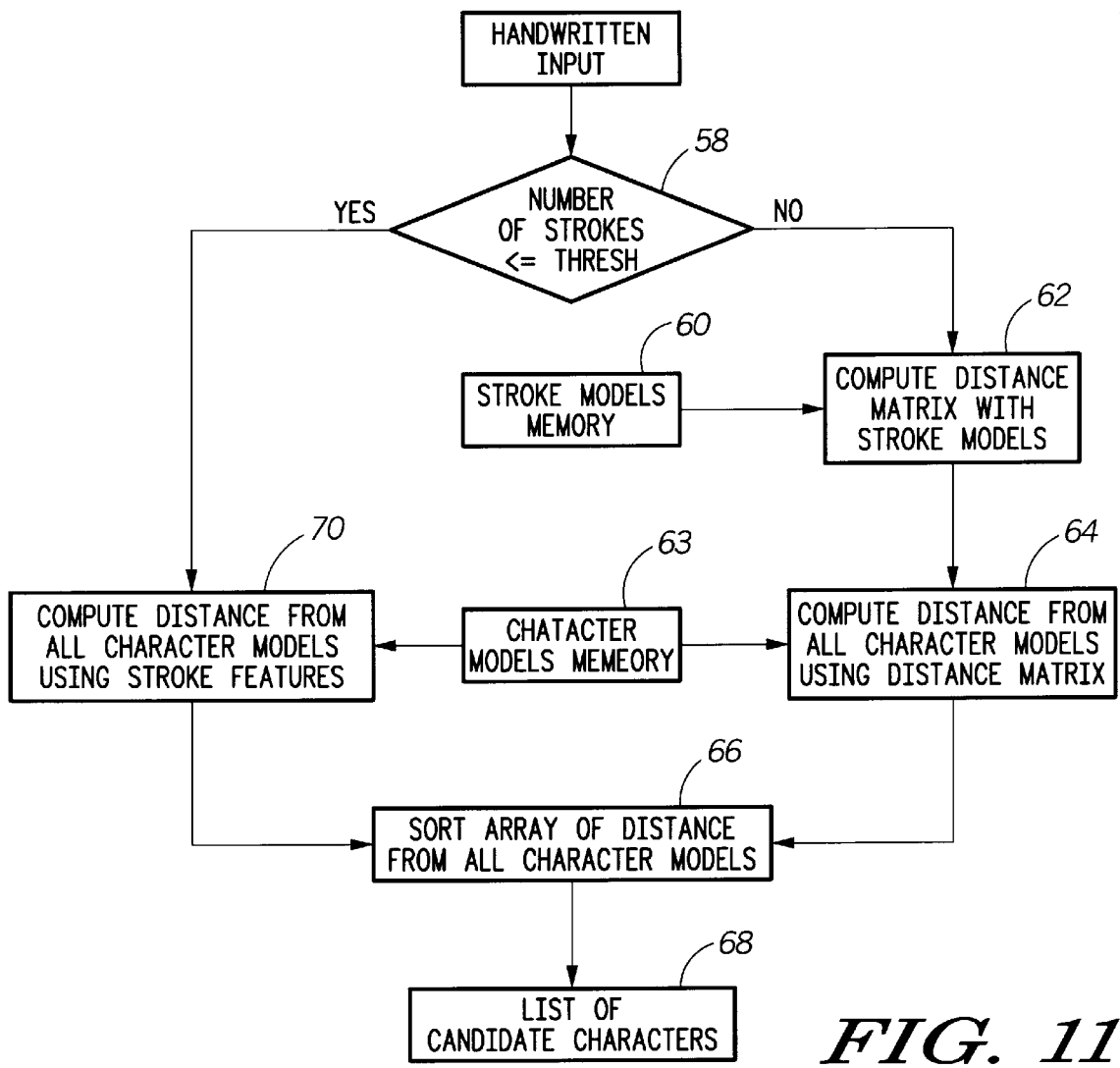
FIG. 11 illustrates a flow chart of a recognition system with multi-resolution character models according to the preferred embodiment of the present invention.

In the preferred embodiment of the present invention, when the handwritten input has only one or two strokes, then the distance matrix is not computed. Instead, strokes in the input and character models are directly compared on the basis of their features. This is feasible since the number of character models with one and two strokes is quite small. The pre-computed distance matrix is used only when the number of strokes in the handwritten input is more than two. FIG. 11 illustrates a flow chart of a recognition system with multi-resolution character models according to the preferred embodiment of the present invention.

Although the preferred embodiment has a single set of 141 stroke models in its implementation, multiple sets of stroke models can also be used. Depending on the number of strokes in the handwritten input at step 58, the appropriate set of stroke models from memory 60 is used to compute the distance matrix at step 62. Depending on the number of strokes in the handwritten input, the appropriate memory block(s) in character models memory 63 (discussed in greater detail below with reference to FIG. 12) is selected. The distance measurement to all character models in the selected memory block(s) is calculated to create an array of distances at step 64. This step of calculating may further comprise performing a look up procedure in a pre-computed distance matrix of individual stroke distances. Once the distance measurements to all character models with the same number of strokes as the input are computed, the array of distances is sorted at step 66 to create a sorted list at step 68. At least one candidate in the sorted list is selected and the at least one candidate in the sorted list is reported by the recognition system. If the number of strokes is less than or equal to the threshold (e.g., two strokes) at step 58, the distance measurements from all character models is computed using stroke features at step 70 as opposed to using the distance matrix.

Figure 12:
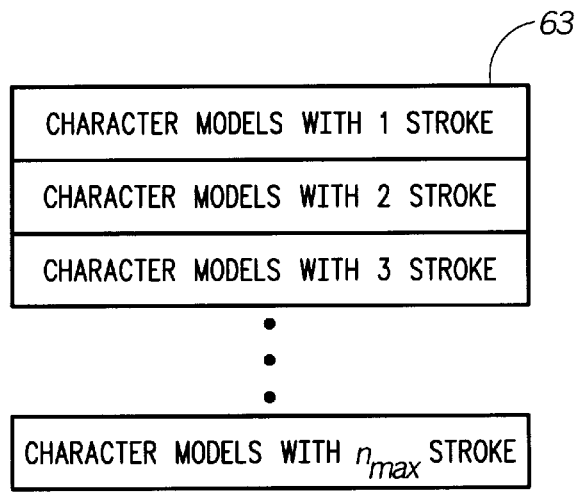
FIG. 12 illustrates a block diagram of a storage mechanism for character models according to the preferred embodiment of the present invention.

FIG. 12 illustrates a block diagram of a storage mechanism (memory) for character models according to the preferred embodiment of the present invention. A plurality of character models are stored in a plurality of memory blocks, wherein a memory block contains character models with an identical number of strokes. It is preferred that no two memory blocks will contain character models having the same number of strokes. The present invention, however, is applicable to situations where more than one memory block contains character models with the same number of strokes. Models for the same character, however, may be stored in more than one memory block. For example, models of the same character written with two different number of strokes are stored in two separate memory blocks.

Figure 13:
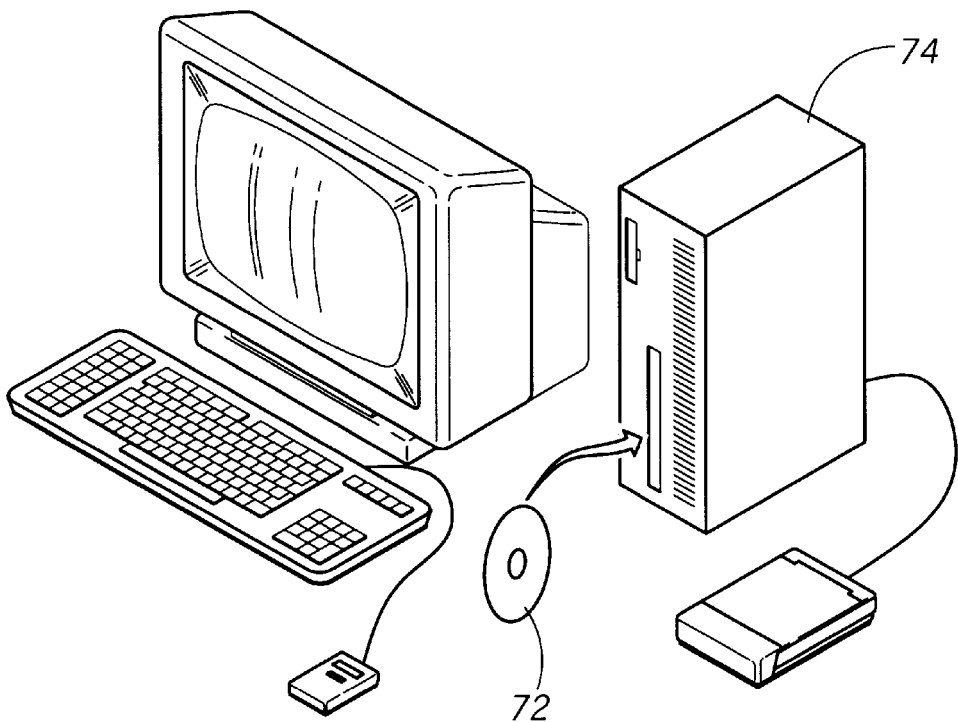
FIG. 13 illustrates a block diagram of a recognition device according to the preferred embodiment of the present invention.
Figure 14:
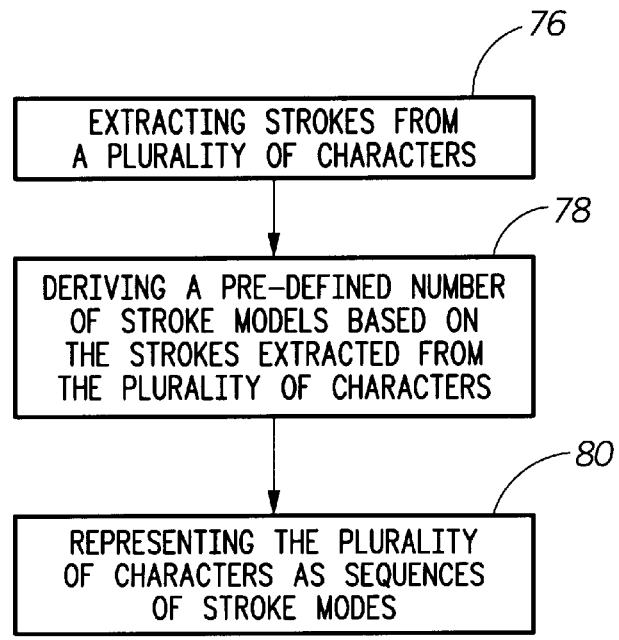
FIG. 14 illustrates a flow chart of the recognition device of FIG. 13 according to the preferred embodiment of the present invention.

Thus, with reference to FIG. 13 and FIG. 14, a storage medium 72 is shown having stored thereon a set of instructions, which when loaded into a microprocessor 74 causes the microprocessor 74 to perform the following functions: extract strokes from a plurality of characters at step 76; derive a pre-defined number of stroke models based on the strokes extracted from the plurality of character at step 78; and represent the plurality of characters as sequences of stroke models at step 80.

While the invention has been described in conjunction with a specific embodiment thereof, additional advantages and modifications will readily occur to those skilled in the art. The method of using multi-resolution models can be modified and extended in several ways. For instance, multi-resolution models can be created by using a different number of features or by changing the features themselves. At a low resolution, the number of features used would be small when compared to a higher resolution representation. Another extension of the present invention is to store the same character model at several resolutions. A low resolution model can be used to do some sort of fast matching to limit the set of possible matches for the input, and the highest resolution models can be used to do the final detailed matching. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:

1. A method of recognizing handwritten characters comprising:
    receiving handwritten input comprising a plurality of strokes;
    computing a set of features for each stroke in the handwritten input;
    storing a pre-determined number of stroke models, the number of stroke models required to define a character being inversely proportional to the number of strokes required to create the character;
    storing character models for a plurality of characters, the character models being comprised of stroke models wherein the stroke models are derived by a clustering analysis of strokes collected from the plurality of characters and wherein the clustering analysis comprises:
        determining a pre-defined number of stroke models;
        computing, for each stroke in the handwritten input, a distance measurement between a stroke and a nearest stroke model;
        separating a fixed percentage of strokes that have a highest number of modeling errors;
        using the fixed percentage of strokes that have the highest number of modeling errors to derive additional stroke models by clustering; and
        repeating the separating and using steps more than once; and
    computing a distance measurement between strokes of the handwritten input and stroke models of a character model.

2. The method according to claim 1 wherein character models are derived to account for variations in stroke order, stroke shape and a number of strokes.

3. The method according to claim 1 wherein a stylus down stroke and a stylus up stroke are treated equally with reference to a stroke model.

4. The method according to claim 1 wherein character models are determined through statistical analysis of a large number of handwritten samples from different writers.

5. The method according to claim 1 wherein the set of features for each stroke in the handwritten input describes a shape of a stroke and a size of the stroke.

6. The method according to claim 5 wherein the size of the stroke is based on a width and a height of a bounding box of the stroke.

7. The method according to claim 5 wherein the shape of the stroke is derived by the following steps:
    dividing the stroke into twelve segments, having endpoints, with equal arc length;
    joining the endpoints of each of the twelve segments with straight lines; and
    computing angles of the straight lines that join the endpoints of each of the twelve segments.

8. The method according to claim 1 wherein the pre-determined number of stroke models is no more than 256 stroke models.

9. A method of handwritten character recognition using multi-resolution models, the method comprising:
    storing a plurality of character models in a plurality of memory blocks, wherein a memory block contains character models with an identical number of strokes;
    determining a number of strokes in a handwritten input;
    storing a pre-determined number of stroke models corresponding to the handwritten input, the number of stroke models required to define a character being inversely proportional to the number of strokes required to create the character, the character models being comprised of stroke models;
    selecting an appropriate memory block corresponding to the number of strokes in the handwritten input;
    calculating a distance measurement to the plurality of characters models in the appropriate memory block to create an array of distances;

sorting the array of distances to create a sorted list;

selecting at least one candidate in the sorted list; and reporting the at least one candidate in the sorted list.

10. The method according to claim 9 wherein the plurality of character models are expressed in terms of strokes selected from at least one pre-defined set of stroke models, wherein each pre-defined set of stroke models is comprised of a finite number of stroke models.

11. The method according to claim 9 wherein the step of calculating a distance measurement to the plurality of character models in the appropriate memory block to create an array of distances comprises performing a look up procedure in a pre-computed distance matrix of individual stroke distances.

12. The method according to claim 9 further comprising storing stroke features directly whenever a distance measurement between a stroke and a nearest stroke model exceeds a threshold.

13. The method according to claim 9 wherein at least one character model is based on characters written with a standard number of strokes.

14. The method according to claim 9 wherein at least one character model is based on characters written with one stroke less than a standard number of strokes.

15. The method according to claim 9 wherein multiple character models are stored for a character to account for variations in writing style.

* * * * *